United States Patent [19]

Kearns

[11] 4,339,698

[45] Jul. 13, 1982

[54] CONTROL APPARATUS FOR WINDSHIELD WIPER SYSTEM

[76] Inventor: Robert W. Kearns, 9725 Lookout Pl., Gaithersburg, Md. 20760

[21] Appl. No.: 29,338

[22] Filed: Apr. 12, 1979

[51] Int. Cl.$^3$ .............................................. H02P 1/04
[52] U.S. Cl. .................................... 318/444; 318/483; 318/466; 318/DIG. 2; 15/250 C; 15/250.12; 15/250.17
[58] Field of Search ............ 15/250 C, 250.12, 250.17, 15/250.04, 250.13; 318/443, 444, 483, 466, DIG. 2

[56] References Cited

U.S. PATENT DOCUMENTS

| | | | |
|---|---|---|---|
| 3,458,889 | 8/1969 | Tann | 15/250.12 |
| 3,483,459 | 12/1969 | Kearns | 15/250.12 X |
| 3,582,732 | 6/1971 | Kovalsky | 15/250.17 X |
| 3,623,181 | 11/1971 | Bailly | 15/250.12 X |
| 3,643,145 | 2/1972 | Tann et al. | 15/250.12 X |
| 3,649,898 | 3/1972 | Inoue | 15/250 C |
| 3,657,618 | 4/1972 | Dri et al. | 15/250.12 X |
| 3,657,626 | 4/1972 | Rouvre et al. | 15/250.12 X |
| 3,691,442 | 9/1972 | Sheldrake | 15/250.13 X |
| 3,849,711 | 11/1974 | Elliott et al. | 15/250.12 X |

*Primary Examiner*—J. V. Truhe
*Assistant Examiner*—Eugene S. Indyk
*Attorney, Agent, or Firm*—Lane, Aitken, Kice & Kananen

[57] ABSTRACT

Control apparatus for an electric windshield wiper motor to permit a plurality of desirable windshield wiper system features to be realized including continuous and intermittent wiping operation with variable dwell, and coordinated manual or automatic wash and wipe operation. Some of the circuits implementing the control apparatus include a Zener diode and require only a single capacitor.

16 Claims, 6 Drawing Figures

CONTROL APPARATUS FOR WINDSHIELD WIPER SYSTEM

BACKGROUND OF THE INVENTION

The present invention relates to windshield wiper systems and more particularly, to electronic control apparatus for controlling the operation of an electric windshield wiper motor to simultaneously permit a number of desirable windshield wiper system features to be realized with a circuit having a minimum "parts" count.

It has long been recognized that under certain driving conditions, such as with light rain or splashing from other vehciles, a vehicle windshield may rapidly alternate between being wet and dry. When such conditions exist, continuous wiper operaiton may cause smearing on the windshield, whereas intermittent wiper operation can provide adequate windshield clearing or cleaning without smearing. Preferably with such an intermittent wiping system, the dwell period between successive wipes may be manually controlled by the vehicle driver to accommodate the particular road conditions.

It is also recognized that it is desirable in a windshield wiper system to provide means for manual and/or automatic activation of a windshield washing and wiping operation to permit a windshield to be adequately cleaned to maximize visibility for the driver. Such systems preferably must operate in coordination with the continuous and/or intermittent wiping controls.

In all such wiper systems, it is desirable for reasons of economy that the control apparatus be implemented with a circuit having a minimum number of relatively inexpensive component parts. However, even though it is desirable to reduce the parts count, it is essential that quality of the overall wiper system performance not be reduced.

The present inventor is the patentee under a plurality of prior U.S. patents relating to windshield wiper systems and related control apparatus, including the following numbered U.S. Pat. Nos.: 3,351,836; 3,483,459; 3,564,374; 3,581,178; 3,582,747; 3,728,603; 3,774,091; and 3,796,936, the disclosures of which are hereby adopted by this reference.

SUMMARY OF THE INVENTION

Accordingly an object of the present invention is to provide apparatus for controlling the operation of a windshield wiper motor in a manner which permits continuous and intermittent operation with variable dwell, and also automatic and/or manually controlled washing and wiping operation to be achieved.

A further object of the invention is to provide control apparatus implemented by a circuit which reduces the component count so that it can be manufactured with low cost, but without sacrificing control performance for a windshield wiper system with which the apparatus is used.

A still further object of the present invention is to provide a control circuit which requires only a single capacitor, preferably having a relatively small Farad value, to permit all necessary timing signals to be generated for all modes of wiper system operation. This feature is particularly significant because capacitors of a size to provide the necessary timing functions cannot be implemented in an integrated circuit whereas the diodes, transistors and resistors of the circuit all can be implemented in a single integrated circuit.

A still further object of the invention is to provide a control apparatus which allows a manual operator to control certain of the time delays and dwell periods during operation of the wiper system.

A still further object of the invention is to provide control apparatus adaptable for use with windsheid wiper systems using electrical motors having differing grounding conventions.

A still further object of the invention is to provide a control apparatus which is adaptable to provide automatic and/or manually activated windshield washing and wiping operations.

A still further object of the invention is to provide a control apparatus which may be adapted to provide automatic initial operation of the windshield wiper system for a predetermined period of time when the vehicle ignition switch is first turned on to start the vehicle.

A still further object of the invention is to provide a control apparatus which is adaptable for use with moisture responsive means to automatically adapt the timing and dwell functions to achieve optimum windshield cleaning.

A still further object of the invention is to provide a control apparatus for a wiper motor which also provides coordinated control of an electric pump motor when operating in the window washing mode.

A still further object of the invention is to provide apparatus which is relatively inexpensive to manufacture and which may be implemented as a plug-in module.

Toward the fulfillment of these and other objects, the present invention includes an electronic control circuit for controlling the operation of an electric windshield wiper motor having a motor shaft and having a switch associated therewith such that the switching state of the switch is determined by the shaft angle of the motor. The circuit includes a transistor switching device controlling energization of the motor and a capacitor controlling energization of the transistor switching device. The switch is operable to control the charge on and voltage applied to the capacitor to provide intermittent operation with a dwell period at the end of each wipe cycle. A windshield washing system is provided with means to condition the capacitor to override the intermittent operation so that a plurality of wipe cycles are provided without dwell when the windshield washing system is activated.

DESCRIPTION OF THE PREFERRED EMBODIMENTS

Figure 1:
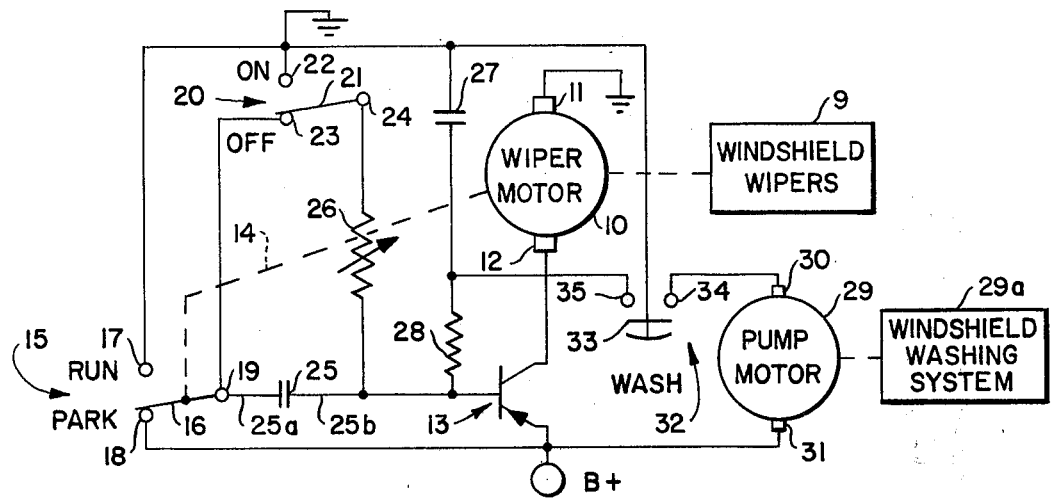
FIG. 1 is a schematic circuit diagram of a windshield wiper and washing fluid pump system illustrating certain features of one embodiment of the present invention.
Figure 2:
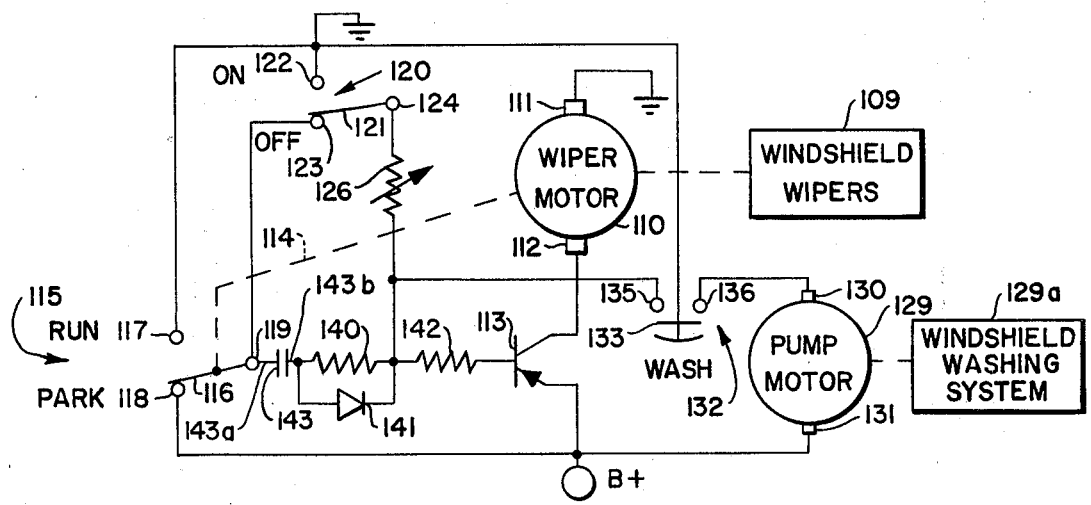
FIG. 2 is another schematic circuit diagram similar to FIG. 1 but with the number of necessary capacitors in the circuit reduced to one according to another embodiment of the present invention.

The several embodiments of the present invention to be described may be most readily understood as improvement inventions of the basic windsheild wiper control circuit shown in FIG. 2 of my U.S. Pat. No. 3,351,836. For example, it is seen that the control circuit of FIG. 1 of this patent has some similarity to the apparatus disclosed in FIG. 2 of my U.S. Pat. No. 3,351,836.

As shown in FIG. 1, a wiper motor 10 is connected to drive wipers 9 over a windshield or other window. The motor 10 has a first terminal 11 which is grounded and a second terminal 12 which is connected to the collector of a PNP bipolar transistor 13, the emitter terminal of which is connected to a B+ power source such as a vehicle battery. Associated with the motor 10 is a linkage mechanism 14 which cooperates with a single pole, double throw switch 15 so that the shaft angle of the shaft of the motor 10 controls the switching state of the switch 15. The switch 15 includes a single pole 16 connected to a switch terminal 19. The pole 16 may be switched alternately between the two throw positions as represented by the terminals 17 and 18 as shown. When the switch 15 provides a conduction path between terminals 18 and 19, the switch is designated as being in the "park" position. On the other hand, when conduction is provided between the terminals 17 and 19, the switch is referred to as being in the "run" position. The reference "park" refers generally to the position of the windshield wipers when in the retracted position at the base of or off of the windshield of the vehicle.

The windshield wiper system of FIG. 1 also includes a manually operable single pole, double throw, "on-off" switch 20, as shown. The switch 20 has a single pole 21 connected to a terminal 24 which is capable of being switched to provide a conduction path between switch terminals 23 and 24 when in the "off" position, and to provide a conduction path between switch terminals 22 and 24 when in the "on" position The "park" terminal 18 of the switch 15 is connected to B+ and the run terminal 17 is connected to ground. The terminal 19 of the switch 15 is connected to the terminal 23 of the switch 20 and also to a first terminal 25a of a capacitor 25. The terminal 22 of the switch 20 is connected to ground.

The second terminal 25b of the capacitor 25 is connected to one terminal of a variable resistance 26, the other terminal of which is connected to the pole terminal 24 of the switch 20. Also connected to the second terminal of the capacitor 25 is the base of the PNP transistor 13 and the first terminal of a resistance 28, the second terminal of which is connected to terminal 35 of a "wash" switch 32 and also to the first terminal of a capacitor 27. The second terminal of the capacitor 27 is connected to ground as shown.

The "wash" switch 32 is a push button switch having three terminal members 33, 34, and 35. When the "wash" switch 32 is "pushed" to activate the "wash" function, each of the three terminals 33, 34, and 35 are connected together. The terminal 33 is grounded, and when the switch 32 is pushed, this causes the terminals 34 and 35 to be grounded. The terminal 34 of the switch 32 is connected to the first terminal 30 of the pump motor 29, the other terminal 31 of which is connected to the B+ power supply. It is seen, therefore, that the pump motor 29 will begin to operate when the "wash" switch 32 is pushed, and will continue to operate so long as the switch 32 is depressed. When the pump motor is energized, it operates a windshield wash system 29a to squirt washing fluid or water onto the windshield.

With the switch 20 in the on position, that is, with the terminal 24 connected to the terminal 22 and with the "wash" switch unactuated, the circuit will operate the windshield wipers intermittently with a variable dwell period at the end of each wipe cycle. This intermittent operation is achieved by the circuit of the switch 15, the capacitor 25, resistor 26 and the transistor 13 in essentially the same manner as described in U.S. Pat. No. 3,351,836 with respect to FIG. 2.

As compared to the apparatus of FIG. 2 of my U.S. Pat. No. 3,351,836, the apparatus of FIG. 1 of the present patent contains the additional of the capacitor 27, the resistor 28, the "wash" switch 32, and the pump motor 29. With these additional elements, a wipe-after-wash performance feature is achieved in addition to and in combination with the controllable variable dwell feature achieved by the apparatus of FIG. 2 of U.S. Pat. No. 3,351,836. As will be further described, this wipe-after-wash performance feature is achieved regardless of whether the switch 20 is in the "on" or the "off" position when the "wash" switch 32 is pushed. Moreover, it will be seen if the switch 20 is in the "on" position when the "wash" switch 32 is pressed, there will be an immediate override of the intermittent dwell wiping operation and a shift to continuous wiping without any dwell for a predetermined number of cycles, for example, three or four wiping cycles, after the wash button is released, before intermittent dwell wiping operation is resumed. If the control switch 20 is in the "off" position when the "wash" switch 32 is pressed, both the wiper motor 10 and the pump motor 29 will immediately start and the wiper motor 10 will move the wipers out of the "park" position. After the "wash" switch 32 is released, the pump motor will stop, but the wiper motor will continue for a predetermined number of wipe cycles, for example, three or four cycles, before the wiper blades are returned, automatically to the "park" position.

As seen in FIG. 1, when the "wash" switch 32 is pressed, the pump motor terminal 30 is grounded, causing full current to flow through the pump motor 29 causing the pump motor 29 to start immmediately and to continue to run until the wash switch 32 is released. At the same time, the second terminal of the resistor 28 is grounded. This allows sufficient current to flow through the base of the PNP transistor 13 to switch the transistor 13 to its conductive state causing the wiper motor 10 to start and operate. By proper selection of the value of the resistor 28, this mode of operation will occur regardless of the positions of the switches 15 and 20, so long as the switch 32 is depressed.

At the same time, pressing the "wash" switch 32 causes the capacitor 27 to be short circuited so that any charge stored therein is discharged through the short circuit to ground. When the wash button is released, the pump motor 29 will immediately stop running, but the current flow out of the base of the PNP transistor 13 will continue through the discharged capacitor 27 until the capacitor 27 recharges. As a result, the transistor 13 will continue to be in the conductive state and the wiper motor 10 will continue to operate at normal speed. The transistor 13 will continue in the "on" condition for a predetermined period of time based on the time constant provided by the resistor 28 and the capacitor 27 which is preferably selected to provide three or four wipe cycles after the pump motor operation ceases when the wash button is released. Because the portion of the total base current of the transistor 13 flowing through the variable reistance 26 is sufficient to cause the transistor 13 to remain in the conductive state, any partial wiping cycle will be completed even if the portion of the base current provided through the resistor 28, itself, would be insufficient as the capacitor 27 charges. Thus, the motor 10 will continue to rotate so that the wiper blades will be returned to the "park" position if the control switch 20 is in the "off" position. If the control switch 20 is in the "on" position, the motor 10 will return to intermittent operation.

The control circuit of FIG. 2 is similar, functionally, to that described above with reference to FIG. 1, except that all of the features of the circuit of FIG. 1 are accomplished with the circuit of FIG. 2 using only a single capacitor 143 instead of two capacitors 25 and 27. Because many of the elements in the circuit of FIG. 2 perform the same or similar functions to the corresponding elements in the circuit of FIG. 1, similar numerical designations have been used. The elements in FIG. 2 performing the same or similar functions as corresponding elements in FIG. 1 except that the number 100 has been added. Generally, the elements which function in the same or a similar manner to that previously described with reference to FIG. 1 will not be further described in detail.

By comparison of the circuit of FIG. 2 with the circuit of FIG. 1, it is seen that the capacitor 27 and the resistor 28 of the circuit of FIG. 1 have been elminated. However, two new resistors 140 and 142 and a diode 141 have been added. The resistor 140 and the anode terminal of the diode 141 are connected to the second terminal 143b of the capacitor 143. The capacitor 143 corresponds generally to the capacitor 25 but will preferably have a different Farad value because of the different arrangement of the circuit of FIG. 2. The diode 141 and the resistor 140 are connected in parallel, and the cathode terminal of the diode 141 is connected to one terminal of the resistor 142 and also to one terminal of the variable resistance 126. The common connection point between the resistors 126, 140, 142 and the diode 141 is, in turn, connected to the terminal 135 of the "wash" switch 132. The second terminal of the resistor 142 is connected to the base of the PNP bipolar transistor 113.

If the "wash" switch 132 has not been recently activated, and the wiper motor has not been operating because the control switch 120 has been in the "off" position, the capacitor 143 will be discharged and the switch 115 will be connecting the first terminal of the capacitor 143b to the switch terminal 118 connected to the B+ voltage supply. Then, if the control switch 120 is thrown to the "on" position, the potential at the common connection point between the resistors 126, 140, and 142 and the cathode end of the diode 141 will initially be lowered to cause the transistor 113 to switch to its conductive state, thereby activating the wiper motor 110 and causing the wiper motor 110 to rotate. As soon as the wiper motor 110 begins to rotate, the pole 116 of the switch 115 will be connected to the "run" terminal 117, thereby connecting the first terminal 143a of the capacitor 143 to ground. The capacitor 143 will then begin to charge through the resistors 140 and 142 and the base emitter junction of the transistor 113 to make the terminal 143b positive with respect to terminal 143a. Due to appropriate selection of the resistances 140 and 142 and 126, sufficient base current will be provided through the base of the transistor 113 to cause the transistor 113 to remain conductive even after the capacitor 143 becomes fully charged, thereby causing the wiper motor 110 to continue to rotate throughout a full rotation cycle until the switch 115 is cycled back to the "park" position. When the switch 115 cycles back to the "park" position, the transistor 113 will be switched to its non-conductive state, thereby stopping the wiper motor 110. The capacitor 143 will then again begin to discharge through the resistance 126 and the diode 141 until the potential at the common connection point between the resistances 126, 140 and 142, and the cathode of the diode 141 becomes sufficiently negative relative to B+ to cause sufficient base current flow through the resistor 142 to cause the transistor 113 to become conductive again. With the circuit arrangement of FIG. 2, it is, therefore, seen that the control switch 120 may be utilized to cause the wiper motor 110 to operate in the normal intermittent mode of operation, with a variable resistor 126 and the single capacitor 143.

The operation of the wash and automatic wipe features provided by the "wash" switch 132 will now be considered. When the wash switch 132 is depressed, full current will immediately flow through the pump motor 129 which will rotate. At the same time, the terminal 135 of the switch 132 will be grounded, thereby causing the common connection point between the resistors 126, 140 and 142, and the cathode of the diode 141 to be grounded. Base current will immediately flow through the base of the transistor 113, thereby causing the transistor 113 to become conductive, in turn, causing the wiper motor 110 to operate. While the "wash" switch 132 is depressed, the switch 115 will cycle back and forth between the "park" and the "run" positions as the shaft (not shown) of the wiper motor 110 rotates. In a preferred embodiment, the "park" position for the switch 115 exists over approximately one-tenth of a rotation, and the "run" position exists over the remaining approximately nine-tenths of a rotation. When the "wash" switch 132 is depressed and the switch 115 is in the "park" position, the capacitor 143 will quickly be charged to a voltage equal to B+, but in the reverse direction with the first terminal 143a positive with respect to second terminal 143b. The rate of charge of the capacitor 143 is limited only by the relatively low resistance of the diode 141 while the diode 141 is conducting. When the switch 115 switches to the "run" position, the second terminal 143b of the capacitor 143 will be stepped to a potential which is negative relative to ground. The capacitor 143 will begin to discharge through the resistance 140 while the "wash" switch is depressed and the switch 115 is in the run position and the wiper motor 110 will continue to rotate at full speed. By appropriate selection of the resistor 140 in combination with the capacitor 143, the amount of charge remaining in the capacitor 143 immediately before the switch 115 is ready to recycle to the "park" position can be controlled. If the wash button 132 is still depressed, when the switch 115 recycles through the park position, the capacitor 143 will again be charged in the reverse direction to full charge.

When the wash switch 132 is released, regardless of whether 120 is in the off or on position and regardless of whether the switch 115 is in the run or park position, sufficient base current will be provided to the transistor 113 to cause the tansistor 113 to remain in its conductive state for several, preferably three or four, wipe cycles without dwell.

When the wash switch 132 is released, the capacitor 143 will discharge through the resistors 140 and 142 and the base emitter junction of the transistor 113. When the switch 115 is in the run position, this discharge circuit will tend to reverse the charge on the capacitor. As a result, the charge on the capacitor 143 will eventually reverse and the second terminal 143b of the capacitor 143 connected to the resistor 140 will become positive. Then when the switch 115 next goes to the park position, at the end of a wipe cycle, the second terminal 143b of the capacitor 13 will be stepped to a potential, more positive than B+, causing the transistor 113 to turn off and stopping the motor 110. Preferably, the value of the capacitor 143 in combination with the resistors 140 and 142 are selected so that the wiper motor will be caused to operate in a continuous wiping mode for three or four wipe cycles after the wash button is released. After that, the wiper motor 110 will cease all operation if the switch 120 is in the "off" position. Alternatively, the wiper motor 110 will revert to intermittent operation with variable dwell if the switch 120 is in the "on" position.

Figure 3:
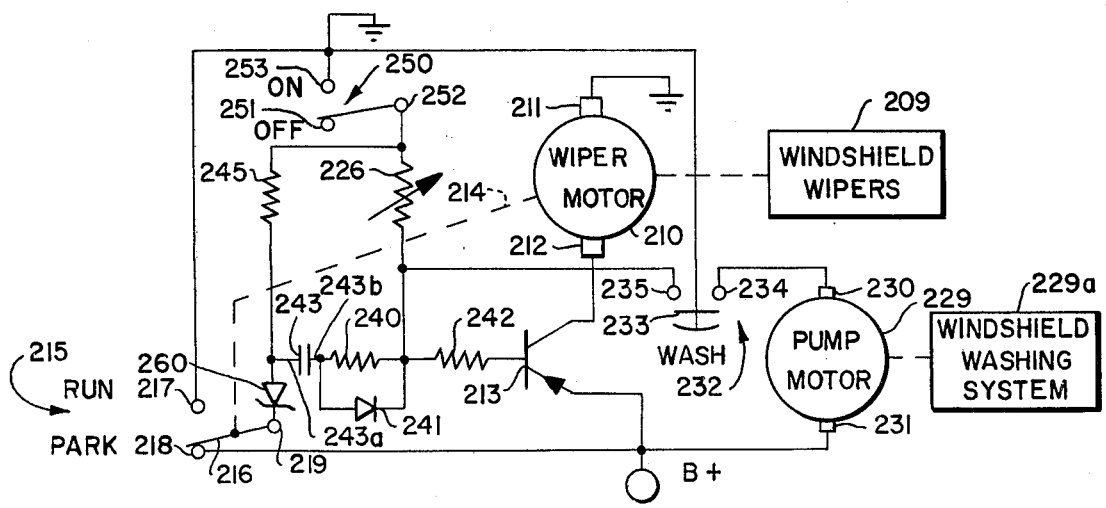
FIG. 3 is another schematic circuit diagram similar to FIG. 2 but illustrating a still further embodiment of the present invention.

The control circuit of FIG. 3 is similar to that of FIG. 2 previously described and achieves the similar functions. However, the circuit of FIG. 3 includes several important differences as compared to the circuit of FIG. 2. Nevertheless, many of the circuit elements in FIG. 3 are comparable to or serve the same function as the corresponding elements in FIG. 2, and such elements are designated in FIG. 3 by numerals having the number 100 added to numerals for comparable elements in FIG. 2.

The circuit of FIG. 3 as compared to the circuit of FIG. 2 contains a number of differences. A single pole, single throw control switch 250 having a pole 251 has been substituted for the control switch 120 of FIG. 2. The pole piece 251 of the switch 250 is connected to a pole terminal 252 which, in turn, is connected to one terminal of the variable resistor 226 which corresponds to the variable resistance 126 connected to the pole terminal 124 in FIG. 2. The "on" terminal 253 of the switch 250 is connected to ground and is comparable to the "on" terminal 122 of the switch 120. It is also seen that a resistance 245 is connected between the first terminal 243a of the capacitor 243 and the pole piece terminal 252 of the switch 250. It is also seen that the first terminal 243a of the capacitor 243 is no longer connected directly to the pole terminal 219 of the switch 215, but instead is connected to the anode terminal of a Zener diode 260, the cathode terminal of which is connected to the pole terminal of the switch 215.

The operation of the circuit of FIG. 3 will now be described. When the switch 250 is switched to the "on" position, the common connection point between the Zener diode 260, the resistor 245, and the capacitor 243 will immediately change to a potential voltage negative relative to B+, based upon the Zener diode breakdown voltage, which, in a preferred embodiment, is preferably approximately 4 volts. In other words, the potential at the common connection point will instantaneously decrease to approximately B+ volts minus 4 volts. Because the charge state of the capacitor 243 cannot change instantly, the second terminal 243b of the capacitor 243 connected to the common connection point of the resistor 240 and the anode of the diode 241 will also instantaneously change so that a potential, negative relative to B+ exists at that point. As a result, base current will flow through the resistor 242 causing the transistor 213 to immediately become conductive, thereby causing the wiper motor 210 to immmediately begin to operate. Thus, it is seen that the circuit of FIG. 3 will result in operation of the wiper motor 210 immediately when the switch 250 is moved to the on position, whereas, in the circuit of FIG. 2, the operation of the wiper motor 110 can be slightly delayed in the case when the on-off switch 120 is turned to on too short a time period after being turned to off. In the circuit of FIG. 2, the capacitor 143 must discharge to complete the dwell period before the transistor 113 will turn on again. In the circuit of FIG. 3, when the switch 215 switches to the "run" position due to rotation of the shaft of the wiper motor 210, the Zener diode 260 will then be forwarded biased and conductive.

From the comparision of the circuit of FIG. 3 with the circuit of FIG. 2, it is seen that the operation of the "wash" switch 232 is comparable in other respects to the operation achieved by the circuit of FIG. 2.

The Zener diode 260 in principle could be replaced by a resistor to achieve the same function. The use of the Zener diode 260 is preferable, however, particularly when the battery power supply such as used in a vehicle does not have a sufficiently low impedance to provide effective power supply isolation or decoupling between different loads. When this situation exists, such as with a "low" battery, current pulses and transients from operation of the wiper motor 210 can be coupled through the capacitor 243 to the control circuit where such transients can adversely affect the timing operation achieved by the control circuit. Although it is possible to use an additional capacitor across the power supply directly at the control circuit to filter such input pulses or transients, the use of such an additional capacitor is contrary to the object of achieving a control circuit requiring only a single capacitor. It is noted that the operation of the Zener diode 260 in the reverse biased condition effectively operates to "filter" such motor pulses or voltage spikes and tends to minimize the adverse effects of a relatively high power supply impedance. Also, the use of the Zener diode 260 is preferably for large scale manufacture as it can be realized using integrated circuit technology. Such is not the case for a filter capacitor.

Figure 4:
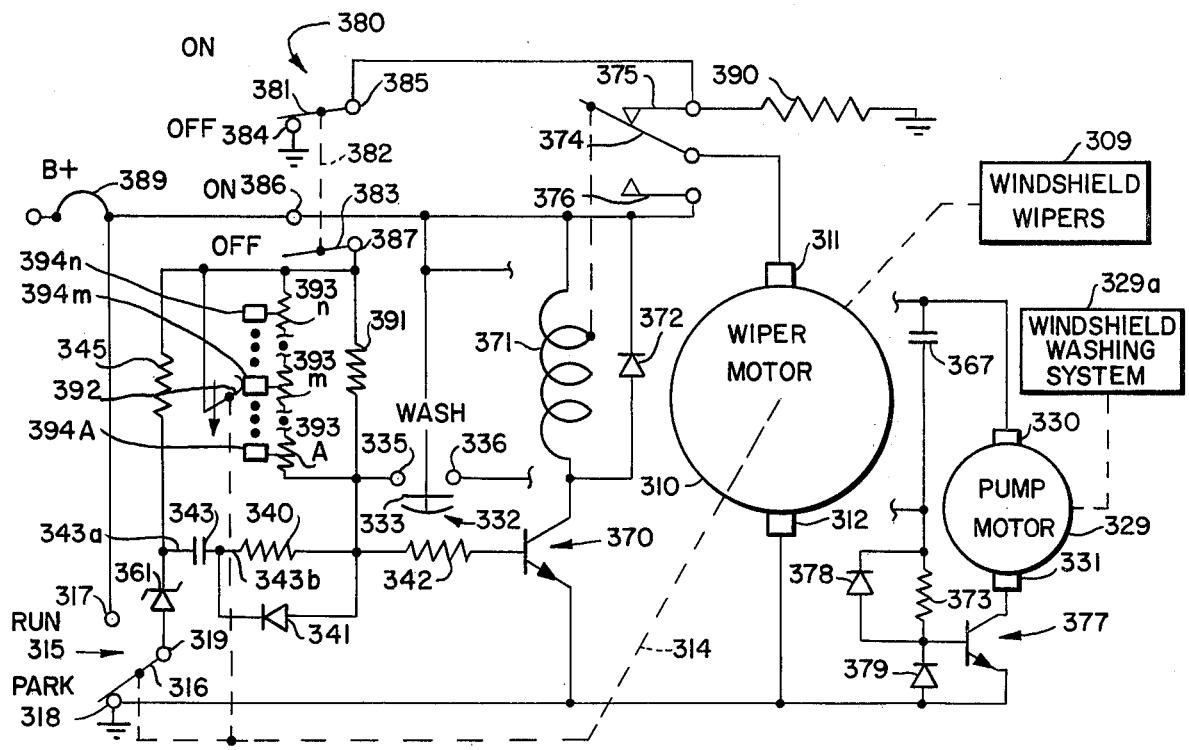
FIG. 4 is another schematic circuit diagram implementing a number of other desirable wiper system features according to the present invention.

FIG. 4 shows still a further embodiment of a control circuit according to the present invention. Many of the elements in the circuit of FIG. 4 are comparable to the elements in the circuit of FIG. 3 and similar numerical designations have been used for the elements. The elements of FIG. 4 which perform substantially the same functions as the comparable elements in FIG. 3 have been disignated by the same numerals, except that the number 100 has been added.

It will be noted that several significant and different features are present in the circuit of FIG. 4 as compared to the circuit of FIG. 3. An electromechanical relay 371 is used in lieu of the switching transistor 213 to directly control the motor 310. However, the switching state of the relay 371 is controlled by the switching of a bipolar NPN 370 which is otherwise generally comparable to the transistor 213. It is also to be noted that the grounding conventions in FIG. 4 are different from those shown for the circuits of FIGS. 1, 2, and 3. This feature requires that NPN bipolar transistors be used in lieu of PNP bipolar transistors, and that the directions of the anode and cathode terminals of diodes be reversed. Also, the pump motor 329 is controlled by an NPN bipolar transistor 377 and a related pump motor control circuit as will be further described. It is also noted that a plurality of moisture responsive means in the form of resistors 393A . . . 393n, contacts 394A . . . 394n and wiper arm 392 are provided to minimize or eliminate the need for a manual adjustment of the dwell time delay. Also, a braking resistor 390 can be provided to cause the wiper motor 310 to stop more quickly in certain situations. Also, a differently configured control switch 380 has been provided in lieu of the single pole, single throw switch 250.

In the circuit of FIG. 4, the B+ or battery power supply is permanently connected to the circuit of FIG. 4 through a circuit breaker 389. It is also noted that the combination of the resistors, 391, 393A . . . 393n, and the contacts 394A . . . 394n may be viewed as comparable to the variable resistance 226 of FIG. 3 which establishes the dwell period provided for the wiping operation during the intermittent wiping mode of operation. Similarly, it should be noted that the NPN transistor 370 directly drives the coil 371 of a single pole, double throw relay 371 in lieu of directly driving the motor 310. A diode 372 is provided across the relay coil 371 to suppress inductive transients which would otherwise occur across the coil 371 when the transistor 370 is switched between its conductive and nonconductive states. The relay 371 includes a single pole, double throw set of contacts including a pole member 374, a normally closed throw contact member 375, and a normally open throw contact member 376. The normally open throw contact member 376 is connected to the battery supply B+ through the circuit breaker 389. The terminal 311 of the motor 310 is connected to the pole member 374 of the relay 371, and when the relay is pulled in so that the pole member 374 is in contact with the throw member contact 376, the motor 310 will operate. Similarly, when the relay is not pulled in, the throw member 374 is in contact with the throw member contact 375 connected to ground either through the braking resistance 390, if the control switch 380 is in the "on" position, or directly through the switch 380 if the control switch 380 is in the "off" position.

Use of the relay 371 satisfies a requirement, for example, that the wiper motor 310 be completely grounded when the control circuit is in the "off" position. A similar relay circuit could also be adapted to the embodiments of FIGS. 1, 2 and 3, if necessary or desirable.

Another major distinction is that the variable resistance 226 of FIG. 3 has been replaced by the resistances 391, 393A . . . 393n, and the moisture responsive means 394A . . . 394n. The moisture responsive means are like those disclosed in U.S. Pat. No. 3,483,459 and are actually contacts on the output gear of the motor. These contacts are positioned to be engaged by a contact brush 392 or finger when the motor is in the region in which the switch 315 is in the park position. This region, for convenience, is referred to as the θ region. As the motor advances further and further into the θ region, the contact brush will short out the resistors 393A . . . 393n in sequence shorting out a greater number as the motor advances further into the θ region. With a greater amount of moisture on the windshield, the wiper blades will encounter less friction and the wiper motor will advance further into the θ region before stopping at the end of a wipe cycle. Thus, as the moisture increases on the windshield, the overall resistance of the network of resistors 393A . . . 393n effectively connected in the RC circuit of the capacitor 343 will be decreased in the dwell period thereby reducing the amount of dwell delay during intermittent operation. In an extreme case, the dwell period will be so reduced that the wiper motor 310 will effectively operate at full speed, without any perceptible delay or dwell, thereby achieving maximum successive wiping operation, such as necessary, for example, during heavy rain.

The control circuit of FIG. 4 also includes a pump motor control circuit. The terminal 331 of the pump motor is connected to the collector of a NPN bipolar transistor 377, the emitter of which is connected to ground. The base of the transistor 377 is connected to a common connection point between the anode of a diode 378, the cathode of a diode 379, and one terminal of a resistance 373. The anode of the diode 379 is connected to ground. The other terminal of the resistance 373 and the cathode terminal of the diode 378 are connected together and also connected to one terminal of a capacitor 367, all of which is commonly connected to the terminal 336 of the "wash" switch 332. The other terminal of the capacitor 367 is connected to the terminal 330 of the pump motor as shown. It is also seen that the contact plate 33 of the wash switch 332 is connected to the terminal 330 of the pump motor and to B+ through the breaker 389. With this circuit arrangement associated with the pump motor 329 as compared to the prior embodiments shown in FIGS. 1 through 3, the pump motor may be actuated for a predetermined period of time by a single momentary depression of the "wash" switch 332. In effect, this pump motor control circuit will cause the pump motor to operate for a predetermined period of time once the "wash" switch 332 is momentarily depressed, rather than requiring the manual operator to hold the "wash" switch 332 in the depressed position for as long as the operator desires to have the pump motor provide washing of the windshield.

More specifically, it is seen that when the wash button 332 is depressed, base current flows in the transistor 370 so that the transistor 370 switches to its conductive state, thereby causing the relay 371 to pull in, thereby activating the wiper motor. Similarly, current is provided through the resistance 373 through the base of the transistor 377 to cause the transistor 377 to switch to its conductive state to thereby cause the pump motor 329 to immediately operate. The "wash" switch 332 also short circuits the capacitor 367 when it is depressed, causing any charge stored therein to be discharged through the switch 332. As a result, when the wash switch 332 is released, base current continues to flow through the resistor 373, thereby maintaining the pump motor in the operating condition, until the capacitor 367 is sufficiently recharged. It is, therefore, seen that the time constant established by the resistor 373 and the capacitor 367, together with the switching characteristics of the transistor 377, determine how long the pump motor 329 will continue to operate after the "wash" switch 332 is released after being depressed. The wash time period in which the pump motor continues to operate is made less than the time period that the wipers are operated through successive wipe cycles without dwell periods between wipe cycles following actuation of the wash switch.

Also, it is seen that by connecting one end of the capacitor 367 to the B+ line through the circuit breaker 389, that when power is initially turned on, for example, by the ignition switch (not shown), the pump motor control circuit will cause the pump motor 329 to automatically operate. By including the diode 378, the period of the initial pump motor 329 operation on initial power up will be shorter than for a subsequently manually activated wash operation.

Accordingly, it is seen that the control circuit of FIG. 4 offers a number of significant advantages and improvements, as well as a completely practical embodiment, for various of the features previously described with reference to FIGS. 1-3.

Figure 5:
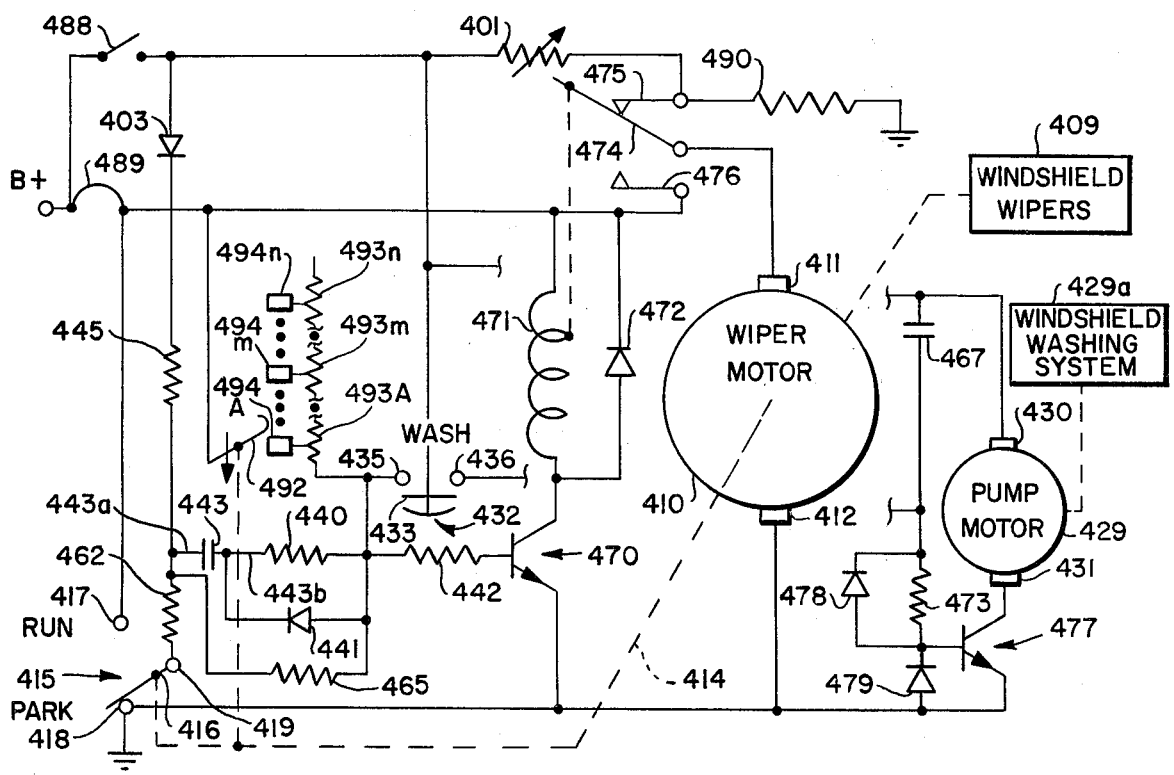
FIG. 5 is a schematic circuit diagram of a variation of the circuit of FIG. 4 with the off/on switch eliminated.

FIG. 5 illustrates a modification of the circuit of FIG. 4 eliminating the off/on switch. In this circuit, the windshield wiping system is always on, but with a very long dwell period when the windshield is dry. When the ignition switch is turned on, the windshield is automatically wiped and washed. Thereafter, the dwell period at the end of each wipe cycle depends on the degree of dryness of the windshield. In the case of a completely dry windshield, the dwell period is selected to be about ten minutes. In the circuit of FIG. 5, the reference numbers are the same as those in FIG. 4 for the corresponding circuit components except 100 has been added thereto so that the reference numbers for FIG. 5 are between 400 and 499.

In the circuit of FIG. 5, the diode 361 of the circuit of FIG. 4 has been replaced by a resistor 462. In addition, a resistor 465 is connected from the junction between the resistors 440 and 442 and the terminal 443a of the capacitor 443. The off-on switch 380 of the circuit of FIG. 4 has been eliminated. Instead the B+ terminal is connected through an ignition switch 488 to the contact plate 433 of the wash switch 432 and through a variable resistor 401 to the fixed contact member 475 of the relay. The ignition switch 488 is automatically closed when the ignition to the automotive vehicle of the system is turned on and is automatically opened when the ignition of the vehicle is turned off. The resistor 445, instead of being connected to B+ through an off/on switch, is connected in series with a diode 403 to the junction between the ignition switch 488 and the resistor 401. The series of resistors 493A . . . 493n is connected at one end to the junction between resistors 440 and 442 similar to the circuit of FIG. 4, but the other end of this string of resistors is unconnected. The wiper contact 492 is connected directly to B+ through the circuit breaker 489. In addition, there is no resistor corresponding to the resistor 391 of FIG. 4 in the circuit of FIG. 5.

The moisture variable means comprising the wiper contact 492, the series of resistors 493A . . . 493n and the contacts 494A . . . 494n operates as follows. At the end of a wipe cycle when the pole contact 416 disengages from the run contact 417 and engages the park contact 418, the wiper arm 492 will at first engage none of the contacts 493A . . . 493n. Then, as the motor 410 begins to move through the θ region where the pole 416 remains engaged with the park contact 418, the wiper arm 492 will begin to engage the contacts 494A . . . 494n. The further the wiper blades move through the θ region, the closer the wiper contacts 492 will come to the last contact 494A, thus reducing the amount of the resistance provided by the resistors 493A . . . 493n in the circuit.

With the ignition circuit off and the wiper blades in the park position, the pole 416 will engage the contact 418. The transistor 470 will be biased off through the resistors 442, and 465 and the relay 471 will be de-energized. As a result, the wiper motor 410 will be de-energized as will the pump motor 429. When the ignition switch 488 is closed, the voltage at the junction between the resistors 445 and 462 will immediately jump in in the positive direction. The jump in voltage will be transmitted to the base of the transistor 470 to turn it on to energize the relay 471 and motor 410 to start a wipe cycle. At the same time, a positive voltage will be applied to the base of the transistor 477 through the capacitor 467 to turn on the transistor 477 and energize the pump motor 429 to start operating the windshield washing system, which will operate until capacitor 467 charges up and then be turned off. Thus, each time the ignition switch is turned on, the windshield washing system is activated and the wiper blades operate through a wipe cycle. After the first cycle, the system will then be in the intermittent mode of operation. During each wipe cycle, the capacitor 443 will charge up with the terminal 443a becoming positive with respect to terminal 443b. At the end of a wipe cycle, when the pole 416 disengages from the run contact 417, the transistor 470 will initially remain energized by current flowing through the resistor 445, the resistor 465 and the resistor 442. When the pole 416 engages the contact 418, this will drop the voltage at the terminal 443a and, as a result, this drop in voltage will be transmitted to the base of the transistor 470 to turn the transistor 470 and the relay 471 off. As a result, the pole contact 474 of the relay will engage the contact member 475 and connect the brush 411 of the wiper motor to the junction between the variable resistor 401 and the resistor 490. As a result, the motor will be energized with a reduced voltage. If the windshield is sufficiently wet, this voltage will be sufficient to drive the wiper blades through the θ region and the pole 416 of the park switch will be moved back into engagement with a run contact 417 so another wipe cycle will begin. On the other hand, if the windshield is not completely wet, the reduced energization of the motor 410 will be insufficient to drive the motor through the θ region and the motor will come to a stop with the pole 416 in engagement with the contact 418. If the windshield is very dry, the wiper motor 410 will come to a stop immediately before the wiper arm 492 engages any of the contacts 494A . . . 494n. As a result, before the transistor 470 can be energized again to re-energize the relay 471 and start another wipe cycle, the capacitor 443 must discharge through the resistor 465 and the diode 441 sufficiently to turn the transistor back on. The value of the resistor 465 is selected so that the transistor 470 will not turn on for about ten minutes if the wiper arm 492 has not reached a point to engage any of the contacts 494. If the windshield has some moisture on it, the wiper motor 410 with reduced energization will drive the wiper blades further into the θ region where the wiper arm 492 engages the contacts 494. Depending upon the wetness of the windshield, the motor will come to a stop at a point to connect more of the resistors 493A . . . 493n into the circuit for dry windshields and less of the resistors 493A . . . 493n into the circuit for wet windshields. After the wiper motor has come to a stop, the capacitor 443 will be discharged much more quickly by current flowing through the resistance of the resistors 493A . . . 493n and the diode 441 for a relatively short dwell period.

The resistor 401 is variable to adjust the moisture variable dwell feature for wear of the wiper blades. As the wiper blades wear, friction between the wiper blades and the windshield will decrease. This decrease in friction would tend to cause the dwell period to decrease as a result of the motion of the motor 410 being driven further into the θ region at the end of a wipe cycle. By increasing the value of the resistor 401, the voltage energizing the motor 410 at the end of a wipe cycle will be reduced so that the motor will be driven less of a distance into the θ region at the end of a wipe cycle. As a result, the wear of the wiper blades can be compensated.

As in the circuit of FIG. 4, actuation of the wash switch will cause energization of the pump motor and the windshield washing system. Actuation of the wash switch 432 will charge the capacitor 443 in the reverse direction as in the circuit of FIG. 4 so as to cause the wiper blades to operate through several wipe cycles immediately following the actuation of the wash switch 432 before the system relapses into intermittent operation.

When the ignition switch 488 is opened, while the wiper motor is operating the wiper blades through a wipe cycle, the transistor 470 will remain turned on by current flowing through the pole 416 of the park switch, the resistor 462, the resistor 465 and the resistor 442 into the base of the transistor 470. The wiper motor will thus continue to drive the wiper blades through a wipe cycle at the end of which the pole 416 will engage the contact 418 to drop the voltage applied to the terminal 443a of the capacitor 443 and, thus, turn the transistor 470 off. The relay 471 will thereupon be de-energized and the resistor 490 will be connected across the wiper motor 410 to electrodynamically brake the motor 410 to a stop.

Thus, with the circuit of FIG. 5, the windshield will be automatically wiped and washed when the ignition switch is first turned on. Thereafter, the moisture responsive means provided by the resistors 493A . . . 493n and the contacts 394A . . . 394n and the wiper 492 monitor the moisture conditions on the windshield, and adapt the intermittent wiping dwell time to maximize visibility through the windshield. Under completely dry glass conditions, the windshield wiper operates with very long dwell periods (about 10 minutes), whereas under moist windshield conditions with the ignition switch on, the windshield wipers operate occasionally or frequently, as necessary.

In the event there is a sudden need for a wipe operation as when the windshield is splashed by another vehicle or a sudden rainstorm occurs, the windshield wipers can be activated immediately for a wipe cycle simply by the actuation of the wash switch. Thereafter, the dwell period will be determined automatically by the amount of moisture on the windshield as described above. The feature of being able to immediately activate the windshield wipers by the wash switch in case of need is also present in the circuits of FIGS. 1 through 4.

Figure 6:
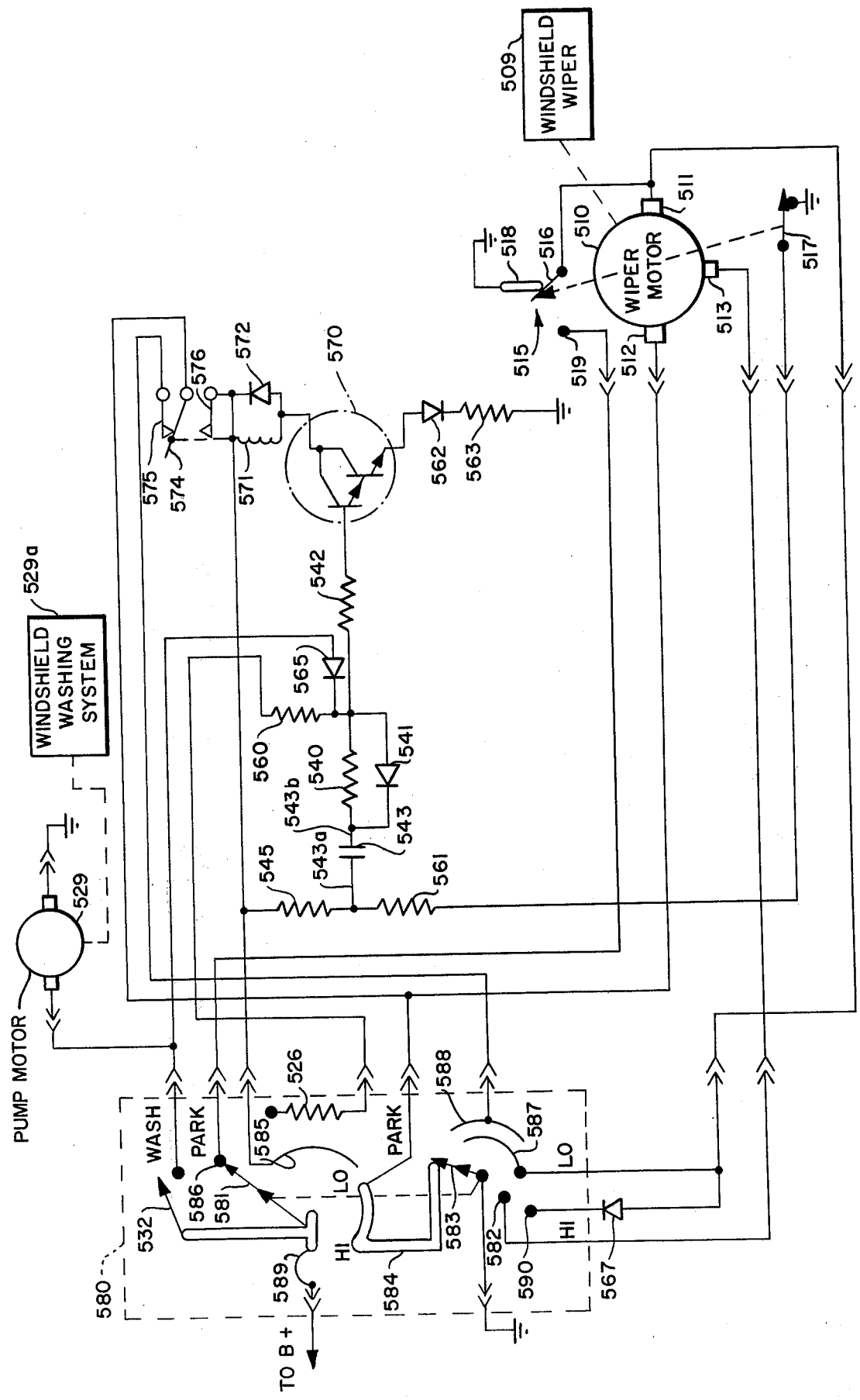
FIG. 6 is a schematic circuit diagram of another embodiment of the invention impelmenting additional features according to the invention.

The circuit of FIG. 6 is another embodiment of the invention designed for use with a single knob control device which can turn the system on, select a high and low speed continuous or select the length of the dwell period. Many of the elements in FIG. 6 are comparable with the elements in the circuits of FIGS. 1–5 and similar designations have been used for the elements. The elements of FIG. 6 are designated with reference numbers from 500 to 599. Those elements which perform substantially the same functions as comparable elements in FIG. 1–5 have been designated by the same units and ten' place digits.

In the circuit of FIG. 6, a unitary control system 580 is provided comprising a first wiper arm 581 and a second wiper arm 583 operated by a single control knob on a common shaft. The extreme counterclockwise position of the control 580 is the park position in which the arm 581 engages a contact 586 and the arm 583 engages a contact 584. By turning the knob to turn the wiper 581 on and wiper arm 583 in the clockwise direction, the control system will be brought to an intermittent position. The wiper arm 581 is the wiper arm of a potentiometer and in the intermittent position, it engages its potentiometer resistance 526. The wiper arm 581 also engages a contact 585 in the intermittent position. In the intermittent position, the wiper arm 583 engages contacts 587 and 588. As the control knob 581 is moved clockwise through the intermittent position, the resistance 526 of the potentiometer connected in the circuit will be reduced.

If the control knob is rotated clockwise beyond the intermittent position, it will be brought to the low speed position in which the wiper arm 581 disengages from the contact 585 and the resistor 526 and engages the contact 584. In the low speed position, the wiper arm 583 will disengage from the contact 588 but will remain in contact with the contact 587. Further movement of the control knob in the clockwise direction will bring the control to the high speed position which is the extreme clockwise position of the control. In the high speed position, the wiper arm 581 will remain engaged with the contact 584 and the wiper arm 583 will engage contacts 582 and 590.

As illustrated, the wiper arm 581 is connected to a B+ through circuit breaker 589 and the wiper arm 583 is connected to ground. A washer switch 532 is provided comprising a normally opened single pole, single throw switch, the pole of which is connected to B+.

A relay 571 having its coil shunted by a diode 572 is driven by a transistor device 570 comprising two NPN transistors connected in a Darlington circuit. The emitter terminal of the transistor device 570 is connected to ground through a diode 562 and a 30 ohm resistor 563. The collector of the transistor device 570 is connected to one side of the coil of the relay 571 and the other side of the coil is connected to the contact 585 in the control device 580.

The pole member 574 of the relay 571 is connected to the contact 584 in the control device 580. When the relay is de-energized, the pole member 574 engages fixed relay contact member 575, which is connected to the contact 588 in the control device 580. When the relay 571 is energized, the pole 574 engages fixed relay contact member 576, which is connected to the contact 585 in the control device 580.

The base terminal of the transistor device 570 is connected through a 1200 ohm resistor 542 and the parallel circuit of a 15 kilohm resistor 540 and the diode 541 to the terminal 543b of a 100 microfarad capacitor 543. The opposite terminal 543a of the capacitor 543 is connected through a 470 ohm resistor 545 to the contact 585 in the control device 580 and also through a 330 ohm resistor 561 to the dwell switch 517 of the motor 510, which drives the windshield wipers 509. The junction between the resistor 540 and the resistor 542 is connected through a 27 kilohm resistor 560 to the resistance 526 of the potentiometer in the control device 580. This junction is also connected through a diode 565 to the wash switch 532 and also to one side of the wash pump motor 529, the other side of which is connected to ground. As in the other circuits, the wash pump motor 529 drives a windshield washing system 529a.

The motor 510, which drives the windshield wipers 509, is a three-brush motor having brushes 511, 512 and 513. When energized between the brushes 511 and 512, the motor 510 will drive the wipers at a low speed and when energized between the brushes 512 and 513, it will drive the windshield wipers at a high speed.

The motor 510 drives a park switch 515 and the dwell switch 517. The dwell switch 517, which comprises a single pole, single throw switch, connects the terminal 543a of the capacitor 543 to ground through the resistor 561 when the windshield motor 510 drives the windshield wipers 509 into the dwell position at the end of each wipe cycle of the windshield wipers. The park switch 515 is a single pole, double throw switching having a pole 516, a contact 518 connected to ground and a contact 519 connected to the contact 586 in the control 580. The pole 516 will engage the contact 518 only when the motor 510 is operated in the reverse direction and the windshield wipers have been driven to the depressed park position and engages the contact 519 when the windshield wipers 509 are out of the park position. The dwell switch 517 is also closed in the depressed park position.

When the control 580 is positioned in the low speed position, the wiper arm 583 grounds the brush 511 of the motor 510 and the brush 512 of the motor 510 will be connected through the contact wiper 581 to B+ thus causing the motor 510 to operate at low speed.

When the control 580 is moved to the high speed position, the brush 513 of the motor 510 will be connected to ground through the wiper arm 583 and the brush 512 will be connected to B+ through the wiper arm 581 thus causing the motor 510 to operate at a high speed. In this position, the wiper arm 583 also connects a diode 567 between brushes 511 and 513.

When the control 580 is moved to the park position, the wiper contact 583 will connect the brush 512 to ground and the wiper 581 will connect the contact 519 to the park switch 515 to B+. Thus, if the windshield wipers are not in the park position, the motor 510 will be energized in the reverse direction between the brushes 511 and 512 to drive the wiper blades to the depressed park position whereupon the brush 511 will be connected to ground through the park switch 515 and the motor 510 will be braked to a stop.

When the control 580 is in the park position and the wiper blades are in the park position, the capacitor 543 will be discharged. When the control is moved to the intermittent position from the park position, current will begin to flow from B+ through resistor 545 into the capacitor 543, out of the capacitor 543 through resistors 540 and 542 and also through resistance 526 and resistor 560 and 542 into the base terminal of the transistor device 570. As a result, the transistor device will turn on energizing relay 571 and cause the contact 574 thereof to engage the contact 576. Therefore, the brush 512 will be connected to B+ through the relay contacts 574 and 576 and the wiper arm 581. This will cause energization of the motor 510 between the brushes 511 and 512 since the brush 511 will be connected to ground through the wiper arm 583. As a result, the motor 510 will begin to drive the wiper blades. As soon as the wiper blades get out of the park position, the dwell switch will open and the park switch 516 will disengage from the contact 518 and engage the contact 519.

While the transistor 570 is turned on and dwell switch is open, current will flow from B+ through the wiper arm 581 and the resistor 545 into the capacitor 543, out of the capacitor through the resistor 540 and the resistor 542 through the base emitter junction of the transistor device 570 and through the diode 562 and the resistor 563 to ground thus charging the capacitor 543 and making the terminal 543a thereof positive with respect to the terminal 543b thereof. During the wipe cycle, the capacitor 543 will be charging toward a value to make the voltage across the capacitor to be about 10 volts. However, the wipe cycle with the windshield wipers wiping across a wet windshield takes only about 1 second and during this period, the capacitor will only charge to about 5 volts.

When the wiper blades have been driven through a cycle and again reach the dwell position, the dwell switch will close immediately stepping the voltage level on the terminal 543a of the capacitor 543 from about +14 volts to about +5 volts. The side 543b will be stepped from about +9 volts to a voltage near ground. This voltage, when applied through resistors 540 and 542 to the base of the transistor device 570, will turn the transistor device 570 off de-energizing the relay 571 and, as a result, the contact 574 will engage the contact 575. Accordingly, ground will be applied to the brush 512 through the contact 574 and the wiper arm 583. As a result, since ground is also applied to the brush 511, the motor 510 will be braked to a stop.

At this time, the capacitor 543 will begin to discharge by current flowing through the resistors 540, 560, 526 and 545. When the capacitor has become sufficiently discharged, the voltage at the base of the transistor device 570 will rise to about +4 volts and the transistor device will be turned on to, thus, energize the relay again and start another wipe cycle as described. Because of the presence of the resistor 563 and the diode 562, the transistor device 570 turns on at an emitter terminal voltage of about +4 volts.

A low resistance path is provided to discharge the capacitor 543 in the park position so that if the control is turned to the park position while the capacitor 543 is charged, then immediately turned to the intermittent position, the capacitor 543 will quickly discharge in the park position. Accordingly, the transistor device 570 will turn on immediately when the control is turned to the intermittent position and a wipe cycle will begin without any delay. The low resistance path which will discharge the capacitor comprises the washer motor 529, the diode 565 in the forward direction, the diode 541 in the forward direction and the resistor 561. The RC time constant for this discharge path is set to be about 0.033 seconds.

The circuit is also designed so that this discharge path will not discharge the capacitor during the dwell periods of normal intermittent operation. This is achieved by properly selecting the value of the resistor 561 and providing the resistor 563 in the emitter circuit of the transistor device 570. In order for this low resistance path not to discharge the capacitor 543 rapidly during intermittent operation, the terminal 543b of the capacitor 543 should not become more negative than −1.4 volts. If this circuit point does not go more negative than −1.4 volts, the diodes 565 and 541 will not conduct because the voltage drop through each diode in the forward direction is 0.7 volts. Accordingly, the capacitor will not discharge through these diodes, but will discharge the resistors 540 and 560 and 526.

If the windshield wipers are wiping over a dry windshield, the capacitor 543 will charge up to a higher voltage value and, thus, the capacitor will take a longer time to discharge thus automatically providing a longer dwell period for a dry windshield than a wet windshield which is desirable.

In the circuit of FIG. 6, like in the previously described circuits, when the washer switch 532 is closed, it will energize the washer motor 529 through an obvious circuit and it will also charge the capacitor 543 up in the reverse direction through the diodes 565 and 541 so that the transistor device 570 will remain energized and operate the wiper blades through several wipe cycles without a dwell period after operation of the wash switch 532.

Accordingly, it is seen that the control circuit apparatus according to the present invention accomplishes the above described objects as well as other objects which will be apparent to those skilled in the art. It will further be apparent to those skilled in the art that various modifications and changes may be made to the present invention without departing from the scope of the invention as defined in the appended claims.

I claim:

1. In a window wiper system having a wiper for wiping a window and a control system for driving said wiper intermittently through wipe cycles with dwell periods at the ends of said wipe cycles, the improvement comprising a pump motor adapted when energized to apply fluid to said window, washer control means to energize said pump motor when actuated, said control system including means to drive said wiper through a plurality of wipe cycles without a dwell period between wipe cycles in response to actuation of said washer control means, said control system including a capacitance and a resistor connected to said capacitance during said dwell period to change the charge on said capacitance during said dwell period and first circuit means responsive to the potential on one side of said capacitance to initiate a wipe cycle at the end of each dwell period and to initiate dwell periods at the end of wipe cycles, and second circuit means responsive to actuation of said washer control means to change the charge on said capacitance so that said first circuit means will not initiate a dwell period at the end of at least the first wipe cycle following actuation of said washer control.

2. A window wiper system as recited in claim 1, wherein said second circuit means charges said capacitance in response to actuation of said washer control means in the reverse direction from that in which said capacitance is charged at the start of each dwell period.

3. A window wiper system as recited in claim 2, wherein said capacitance discharges from the reverse charge condition of said capacitance to which said capacitance is charged in response to actuation of said washer control means toward the forward charge condition of said capacitance during said wipe cycles, said first circuit means initiating a dwell period at the end of the wipe cycle in which said capacitance switches from said reverse charge condition to said forward charge condition.

4. A window wiper system as recited in claim 1, wherein said first circuit means includes a transistor which is rendered conductive and non-conductive in response to the voltage on said one side of said capacitance and means to initiate a dwell period in response to said transistor changing between said non-conductive and conductive states and to initiate a wipe cycle in response to said transistor changing in the opposite direction between said non-conductive and conductive states.

5. A window wiper system as recited in claim 1, further comprising an on-off control having an off position and an on position, said control system resuming driving said wipers intermittently following said plurality of wipe cycles when said on-off control is in said on position.

6. A window wiper system as recited in claim 1, including an off-on switch control having an off position and an on position and third circuit means to change the potential on said one side of said capacitance to initiate a wipe cycle in response to said off-on control being switched to said on position.

7. A window wiper system as recited in claim 6, wherein said third circuit means includes a Zener diode connected between the other side of said capacitance and a reference potential when said wiper is positioned at the end of a wipe cycle.

8. In a windshield wiper system having a wiper for wiping a window of an automotive vehicle, having an ignition the improvement of a control system energized whenever the ignition of said automotive vehicle is turned on driving said wiper intermittently through wipe cycles with dwell periods at the ends of said wipe cycles, a pump motor adapted when energized to apply fluid to said window, washer control means to energize said pump motor when actuated, said control system including means to drive said wiper through at least one wipe cycle in response to the actuation of said washer control means, and means to vary the length of said dwell period at the end of each wipe cycle depending upon the amount of moisture on said windshield during said wipe cycle.

9. Apparatus for controlling the operation of a window wiper system having a wiper, a wiper motor and a single pole, double throw switch associated therewith, the switching state of said switch being determined by the position of the wiper comprising:
   a capacitor, the first terminal of which is adapted to be operably connected to the pole terminal of the switch;
   a switching transistor connected in circuit with said wiper motor so that the on or off switching state of said transistor controlled by its base current is adapted to control the operating state of the wiper motor;
   a first diode and a first resistor connected in a parallel circuit between the second terminal of said capacitor and the base of said switching transistor; and
   a second resistor, and circuit means operable to connect said second resistor between a source of power and the side of said parallel circuit connected to the base of said switching transistor.

10. Apparatus according to claim 9, further comprising a Zener diode, the first terminal of which is adapted to be connected to the pole terminal of the switch, the second terminal of which is connected to the first terminal of said capacitance.

11. Apparatus according to claim 11, further comprising a third resistor, the first terminal of which is connected to the second terminal of said Zener diode.

12. Apparatus according to claim 9, further comprising a "wash" switch, one terminal of which is adapted to be connected to the side of said parallel circuit connected to the base of said switching transistor; and a pump motor, one terminal of which is operably connected to one terminal of said "wash" switch.

13. Apparatus according to claim 9, further comprising:
a "wash" switch, one terminal of which is adapted to be connected to the side of said parallel circuit connected to the base of said switching transistor;
means for controlling a pump motor comprising a capacitance and a resistor, one terminal of said capacitor and one terminal of said resistor being connected to one terminal of said "wash" switch; and
a pump motor connected to said means for controlling a pump motor.

14. In a window wiper system having a wiper for wiping a window and a control system for driving said wiper intermittently through wipe cycles with dwell periods at the ends of said wipe cycles, the length of said dwell period depending upon the degree of dryness of said windshield being longer for dry windshields and shorter for wet windshields, the improvement wherein the window wiper system includes means to energize said wiper motor with a reduced voltage at the end of each wipe cycle, and means to control the length of said dwell period by the distance that the wiper blades move at the end of a wipe cycle after said motor is energized with reduced voltage.

15. A window wiper system as recited in claim 14, including means for varying the reduced voltage applied to said motor at the end of said wipe cycle to compensate the system for changes in friction between the windshield wipers and the window wiped thereby due to wear of the wiper blades.

16. In a window wiper system for an automotive vehicle having an ignition switch, said wiper system having a wiper for wiping a window and a control system operable to operate said wiper in an intermittent mode, driving said wiper through wipe cycles with dwell periods at the ends of said wipe cycles, the length of the dwell period provided at the end of each wipe cycle depending upon the degree of dryness of the windshield, there being a longer dwell period for relatively dry windshields and a shorter dwell period for wet windshields, the improvement wherein said control system includes means to automatically operate said wiper in said intermittent mode whenever the ignition switch of said automotive vehicle is turned on.

* * * * *